US007100716B2

(12) United States Patent
Engels et al.

(10) Patent No.: US 7,100,716 B2
(45) Date of Patent: *Sep. 5, 2006

(54) MODULAR WHEEL CHAIR

(75) Inventors: Bernd Engels, Albstadt (DE); Ralf Ledda, Bitz (DE); Marc Binder, Argenbühl (DE); Thomas Birmanns, Balingen (DE)

(73) Assignee: Ulrich Alber GmbH, Albstadt (DE)

( * ) Notice: Subject to any disclaimer, the term of this patent is extended or adjusted under 35 U.S.C. 154(b) by 226 days.

This patent is subject to a terminal disclaimer.

(21) Appl. No.: 10/201,570

(22) Filed: Jul. 24, 2002

(65) Prior Publication Data

US 2003/0030243 A1 Feb. 13, 2003

(30) Foreign Application Priority Data

Jul. 26, 2001 (DE) ........................................ 101 36 368

(51) Int. Cl.
*B60G 3/14* (2006.01)
*B60K 1/04* (2006.01)
*B62D 27/06* (2006.01)

(52) U.S. Cl. .................................... 180/65.1; 280/304.1

(58) Field of Classification Search ................ 180/65.1, 180/65.5, 208, 907, 312, 291; 280/250.1, 280/304.1, 47.39, 47.4, 650, 783, 782
See application file for complete search history.

(56) References Cited

U.S. PATENT DOCUMENTS

| | | | | | |
|---|---|---|---|---|---|
| 4,570,739 | A | | 2/1986 | Kramer | |
| 4,887,826 | A | | 12/1989 | Kantner | |
| 4,951,766 | A | | 8/1990 | Basedow et al. | |
| 4,960,287 | A | | 10/1990 | Lautzenhiser et al. | |
| 5,042,607 | A | * | 8/1991 | Falkenson et al. | 180/208 |
| 5,076,390 | A | * | 12/1991 | Haskins | 280/250.1 |
| 5,176,393 | A | * | 1/1993 | Robertson et al. | 280/250.1 |
| 5,291,959 | A | * | 3/1994 | Malblanc | 180/11 |
| 5,540,297 | A | * | 7/1996 | Meier | 180/65.5 |
| 5,772,237 | A | | 6/1998 | Finch et al. | |
| 5,853,059 | A | * | 12/1998 | Goertzen et al. | 180/65.6 |
| 6,027,132 | A | * | 2/2000 | Robinson et al. | 280/250.1 |
| 6,056,077 | A | * | 5/2000 | Kobayashi | 180/216 |
| 6,139,037 | A | * | 10/2000 | Papac | 280/250.1 |
| 6,234,507 | B1 | * | 5/2001 | Dickie et al. | 280/304.1 |
| 2001/0011613 | A1 | * | 8/2001 | Schaffner et al. | 180/65.1 |
| 2003/0168265 | A1 | * | 9/2003 | Goertzen et al. | 180/65.1 |

FOREIGN PATENT DOCUMENTS

| | | | |
|---|---|---|---|
| AU | 583432 | | 5/1987 |
| DE | 29 47 327 A | | 6/1980 |
| DE | 199 33 052 C1 | | 7/1999 |
| EP | 0 737 464 A2 | | 10/1996 |
| EP | 0 945 113 A2 | | 3/1999 |
| GB | 2 184 006 A | | 6/1987 |
| GB | 2265868 | * | 10/1993 |

OTHER PUBLICATIONS

European Search Report.

* cited by examiner

*Primary Examiner*—Anne Marie Boehler
(74) *Attorney, Agent, or Firm*—Arent Fox, PLLC

(57) ABSTRACT

The invention relates to a small vehicle, particularly a wheel chair, having a modular structure including a main component, at least one pivotable wheel which is adapted to be detachably mounted at said main component via a quick release device, at least one driving wheel adapted to be detachably mounted at said main component via a quick release device and a seat component which is adapted to be detachably mounted at said main component via a quick release device. The main component comprises a main body to which four arms for supporting the wheels are springably coupled. The quick release devices between said main component and said wheels are disposed between said arms and said wheels, respectively.

16 Claims, 7 Drawing Sheets

MODULAR WHEEL CHAIR

BACKGROUND OF THE INVENTION

The invention relates to a small vehicle, particularly a wheel chair having a modular structure.

Wheel chairs, including those which are driven by a motor, usually comprise a wheel chair frame in which a seat is integrated, two wheels which can be driven and two wheels which can be either freely pivoted or steered by a motor wherein said wheels are directly coupled to said frame. The drivable wheels can be driven manually via hand rims or driven by a motor. Such wheel chairs often comprise a folding mechanism which allows folding of the wheel chair frame in order to reduce the overall size for the purpose of transport of the wheel chair. A wheel chair of this kind is for instance disclosed in EP 0 790 049 A2.

Wheel chairs of the kind as explained above are rather unsuitable for outdoor operation, that is for operation outside houses and particularly on uneven tracks, for instance tracks in fields or woods. The frame construction as described above has only a relatively low stability. Moreover, direct coupling of the wheels to a pipe frame only allows a suspension which is insufficient for uneven tracks since the only spring system is usually the one provided by the pneumatic tires.

Wheel chairs having acceptable driving and performance characteristics for outdoor operation are also known. However, the amount of time, work and effort needed for dismantling such wheel chairs for the purpose of transport is not acceptable.

There is a need for a small vehicle, particularly a wheel chair which has sufficient stability suitable also for outdoor operation as well as a drivability suitable for outdoor operation and, at the same time, can be dismantled so that transport thereof is possible in a typical trunk of an automobile.

SUMMARY OF THE INVENTION

The small vehicle according to the present invention has a modular structure including a main component, at least one pivotable wheel which is detachably mounted at said main component via a quick release device, at least one driving wheel is detachably mounted at said main component via a quick release device and a seat component which is detachably mounted at said main component via a quick release device. The main component comprises a main body to which four arms for supporting the wheels are springably coupled. The quick release devices between said main component and said wheels are disposed between said arms and said wheels, respectively.

While according to the prior art discussed above a seat is integrated in a pipe frame which, for the purpose of transport, can be folded, the small vehicle according to the present invention has a modular structure and comprises a main component which permits detachment of the wheels and detachment of the seat component from the main component by means of a quick release device. This provides particularly small dimensions for transport and, at the same time, high stability and strength.

Preferably, the main body is designed as a monocoque-type construction The main body supports the suspension.

If the wheels are dismounted, preferably, the tour arms extend within a common plane so that the main component, including the main body and the four arms connected thereto, has a flat shape. In other words, the main dimensions of the main component lie preferably within one plane while the dimensions perpendicular to said plane are considerably smaller. Accordingly, after being dismantled, the small vehicle has outer dimensions in the same range as a folded wheel chair of the kind explained earlier. In many instances, the small vehicle is even superior in this respect while, at the same time, it has considerably higher stability and strength and lower weight.

The smallest possible cuboid having side lengths a, b and c which can envelope the main body and the four arms attached thereto without wheels can for instance have one side length “c” which is smaller than half of the two other side lengths “a” and “b”. In this case, side lengths a and b correspond to the main dimensions and side length c corresponds to the height of the cuboid having a flat shape.

Two freely pivotable wheels and two driving wheels are detachably mounted to the arms via a quick release device. The driving wheels preferably comprise a hub motor; that is, a motor which is provided adjacent the wheel hub. Accordingly, it is not necessary to provide a drive train from the vehicle frame to the driving wheels. The torque for driving the vehicle is provided in the hub motor. The stationary portion of the hub motor is only supported at the corresponding arm via a suitable support element to enable driving operation.

Electric motors are particularly suited for driving such small vehicles. Storage batteries necessary for power supply can be mounted at the main component, particularly at the main body, preferably via suitable quick release devices which allow quick and easy change of the storage batteries. Connection points for the storage batteries can be provided at opposite sides of the main body. Moreover, several connecting points may be provided for selective operation with one or several storage batteries, wherein, in case the vehicle is to be operated with only one storage battery, this storage battery is mounted in a central position with respect to the center axis of the vehicle, while, if the vehicle is to be operated with several storage batteries, these storage batteries are mounted symmetrically with respect to the center axis of the vehicle.

The seat component of the small vehicle according to the present invention preferably comprises a seat, a seat back, foot rests, and two arm rests. Preferably, the seat component is provided as a complete unit. This unit is mounted to the main component, specifically to the main body and to be dismounted therefrom by means of a quick release device. The seat component can be foldable. Due to the modular structure of the small vehicle, the seat can be designed with particular attention to ergonomics. For instance, a seat pan may be provided which is specially designed and, as the case may be, specially designed for a particular patient. Such a seat pan can be easily mounted at the main component. Accordingly, even seat pans for seriously handicapped persons can be used. Furthermore, it is easy to retrofit or modify the wheel chair, especially with respect to a special seat pan.

The interface between the seat component and the main body is preferably designed in a way which facilitates adaption of a special seat. For instance, a special seat may be provided by specialized suppliers, such as for example, stores specialized in medical appliances and equipment. In other cases, a seat may be specially made for a particular application. The special seat may be designed to be connected to a wheel chair according to the present invention which is produced in a larger number of pieces but the wheel chair has been delivered without the seat component.

The seat component can be designed so that it can be turned, so that, upon turning the seat by 180°, a vehicle having rear wheel drive will become a vehicle which has front wheel drive.

The arms for supporting the freely pivotable wheels are preferably designed as springably supported dual arms. This ensures that the caster of the freely pivotable wheels remains essentially constant over the entire range of spring motion, particularly in case the freely pivotable wheels are coupled to the arms by means of plug-in axles which extend vertically to the ground, In case there is only a limited travel of the spring system, the front arms also can be designed as mono-arms.

The arms provided for supporting the driving wheels are preferably designed as longitudinally arranged arms which are supported at the main body via a spring/shock absorber unit.

A small vehicle designed as a wheel chair as explained above has excellent stability. The wheels may be springably supported to also allow operation on uneven tracks. At the same time, the structure and design of the wheel chair allow it to be dismantled into single components, making it possible to transport the wheel chair in the trunk of a common automobile. After the four wheels are detached from the arms, which for instance, can be done very easily if plug-in axles and quick release devices are used, and after the seat component and, as the case may be, storage batteries are removed, only the main component, for instance the main body and four arms, remain. This main component is a component having a flat shape which can be easily transported. The wheels and the storage batteries also can be easily stowed away and the seat component can also be brought into a space-saving flat form if a folding mechanism is used.

Particularly in cases where electric motors are used as driving units, the main body can have interfaces for electric circuits at the connection points of the driving wheels and/or the seat component and/or the storage batteries. A control panel, including a console, can be provided at an arm rest of the seat component. Furthermore, it is possible to provide wireless signal transmission between the control panel and the driving wheels. In case that hub motors are provided, a separate control unit may be provided for each hub motor. In that case, it will not be necessary to provide wires for control signals. If the storage batteries are attached to the main body, it will only be necessary to provide power transmission to the hub motors.

If the storage batteries are also disposed adjacent the wheel hubs of the driving wheels and a wireless signal transmission for control signals is provided, it will not be necessary to provide any wires between the frame and the wheels.

BRIEF DESCRIPTION OF THE DRAWINGS

In the following description, the invention is further explained in connection with a preferred embodiment making reference to the drawing in which.

DESCRIPTION OF PREFERRED EMBODIMENTS

Figure 1:
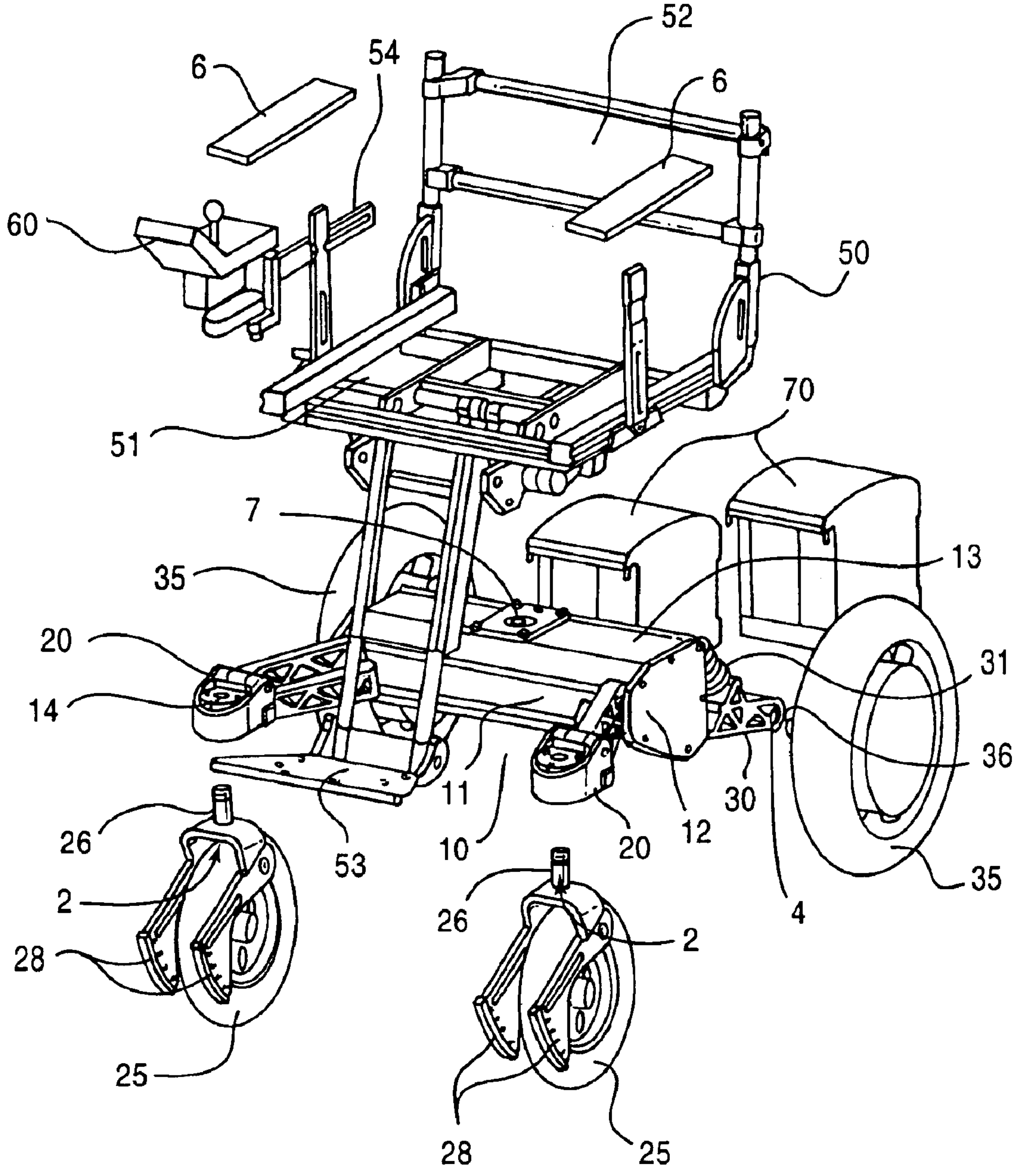
FIG. 1 is a perspective representation of a vehicle where the parts are taken apart in exploded view.
Figure 2:
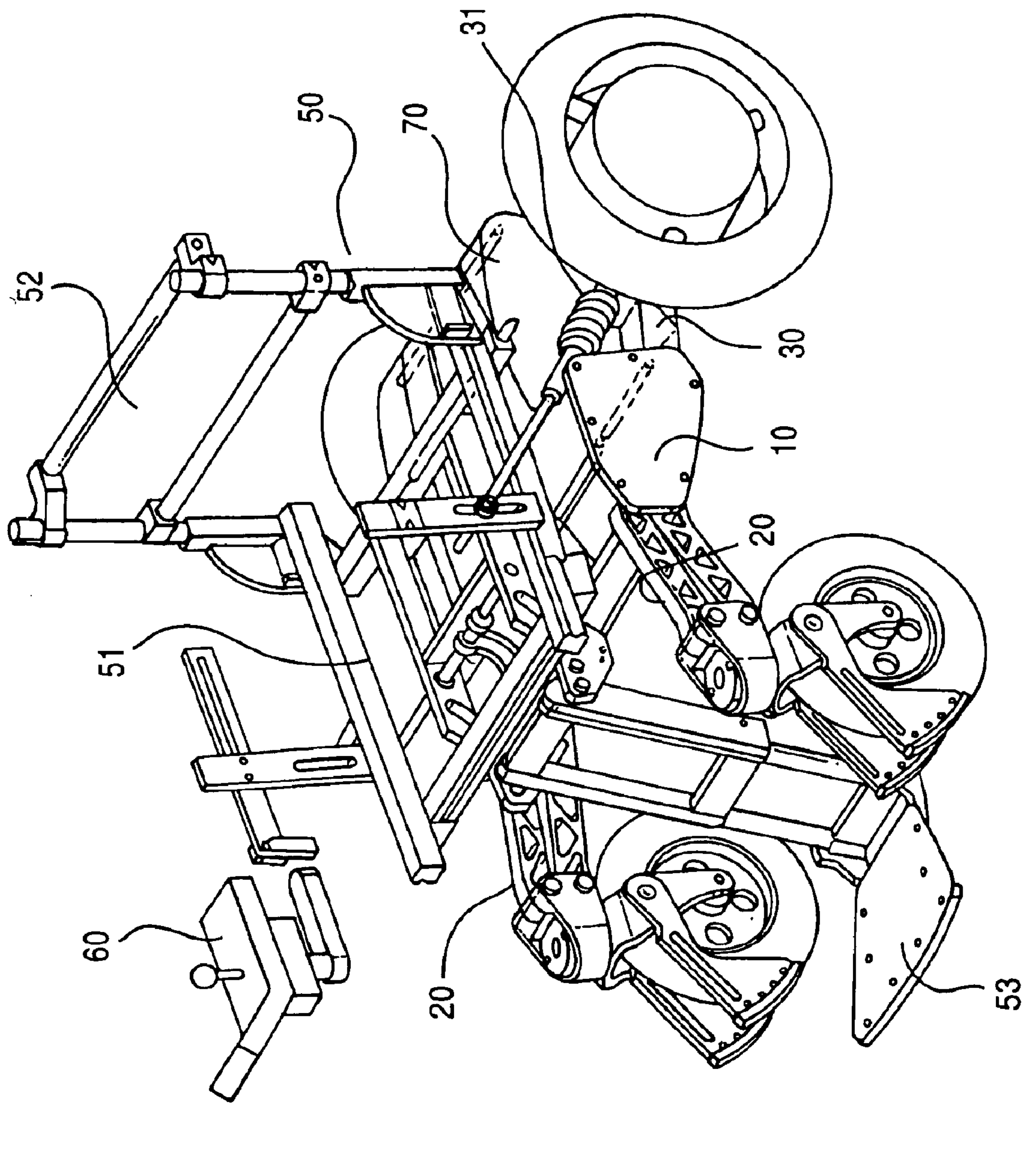
FIG. 2 is a perspective representation of the vehicle corresponding to FIG. 1 wherein the main components except a control panel are depicted as being assembled.

FIG. 1 shows a wheel chair as an embodiment of the present invention in a so-called exploded view, i.e. with the parts taken apart. The main body 10 is manufactured from an extruded profile, i.e. it is provided in the form of a hard alloy extrusion or extruded shape made of an aluminum alloy 11. The hard alloy extrusion 11 is closed at both longitudinal ends by corresponding end plates 12 and respective bolts. Internal reinforcing members (not shown) or other components, for instance switching units etc. (not shown) can be provided in the essentially hollow inner space of the main body 10. On the upper side 13 of the main body 10 there is provided a receiving unit 14 which serves for mounting of a seat component 50 by means of a quick release device 7 which is shown in FIG. 1.

The seat component 50 comprises frame profiles which together with fabric or upholstery provide a seat 51, a seat back 52, a foot rest 53 and a strut 54 for mounting a control panel 60. It is understood that armrests (not shown) can be provided on both sides.

It is also clear that other structures are possible for the seat component; for instance, a seat, a seat back and, as the case may be, corresponding side parts. The whole seat component 50 can be provided as a monocoque structure and can have corresponding connecting elements for connecting the seat component to the main body or to a corresponding seat frame.

The seat component is provided with a folding mechanism which allows the seat component 50 to fold when it is detached from the main body 10 so that the seat can be easily transported as one element of substantially flat shape.

On the left side and on the right side, with reference to the driving direction of the vehicle, two front arms 20 and two rear arms 30, respectively, are connected to the main body 10. The rear arms 30 are designed as longitudinal arms which are supported at the main body 10 by means of a spring/shock absorber unit 31. The front arms 20 are designed as dual arms which are connected to each other by a spring/shock absorber mechanism which is disposed within the main body 10 and which is not shown in the drawings. The main body 10 and the arms 20, 30 form a main component.

Figure 5:
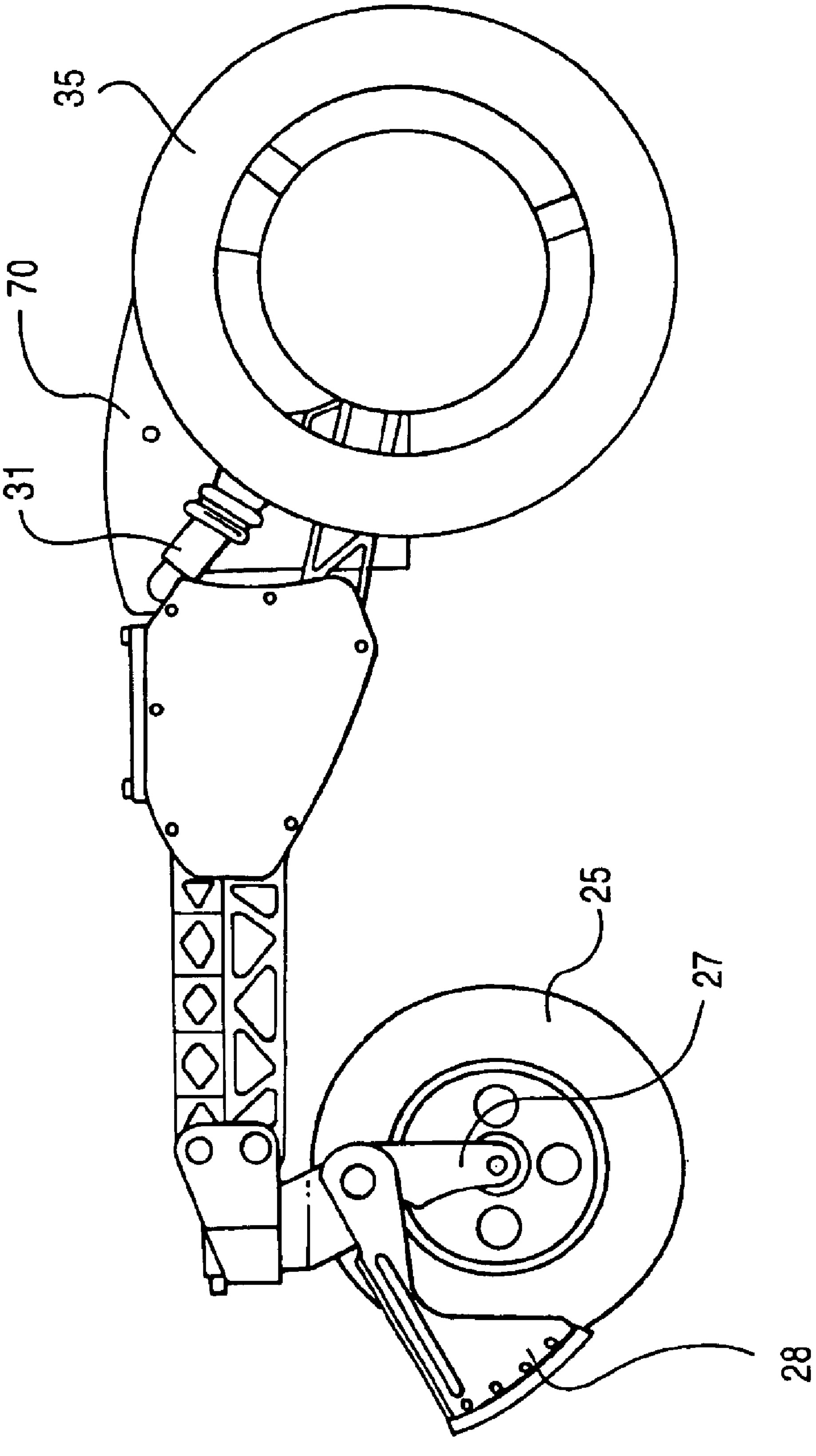
FIG. 5 is a side view of the representation according to FIG. 3.

The two driving wheels 35 are coupled to the rear arms 30 via horizontally extending plug-in axles 36 and via quick release devices 4 which are shown in FIG. 1. Two front wheels 25, which are freely pivotable, are coupled to the front arms 20 via vertically extending plug-in axles 26 and via quick release devices 2 which are shown in FIG. 1. As can be seen for instance from FIGS. 5 to 7, the position of the axis of rotation 27 of the front wheel 25 is offset with respect to the position of the plug-in axle 26. Consequently, a caster is provided so that the front wheels 25 are always oriented towards the driving direction when the vehicle is driving straight ahead. The steering of the wheel chair is effected by separate control of both driven rear wheels 35. Preferably, the driving force is provided by hub motors, i.e. electric motors which are provided in the hub region of the wheels and not shown in detail. Steering commands are input via a control panel 60.

The front arm 20 (illustrated as a dual arm) is designed in a way that the caster of the front wheel 25 remains substantially constant over the entire range of travel of the spring system.

Figure 3:
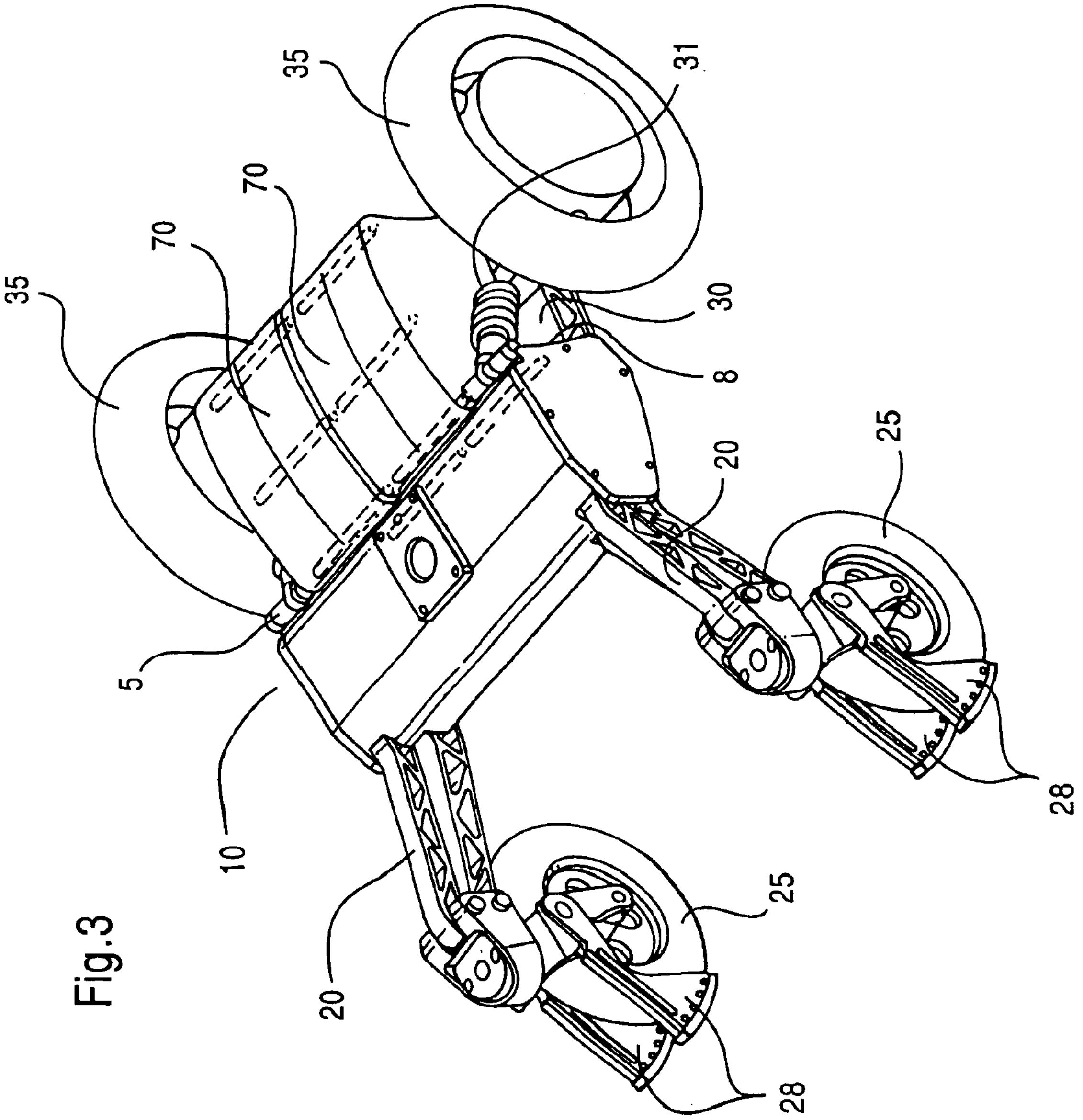
FIG. 3 is a perspective depiction of the wheel chair according to FIGS. 1 and 2 where the seat component is omitted.
Figure 4:
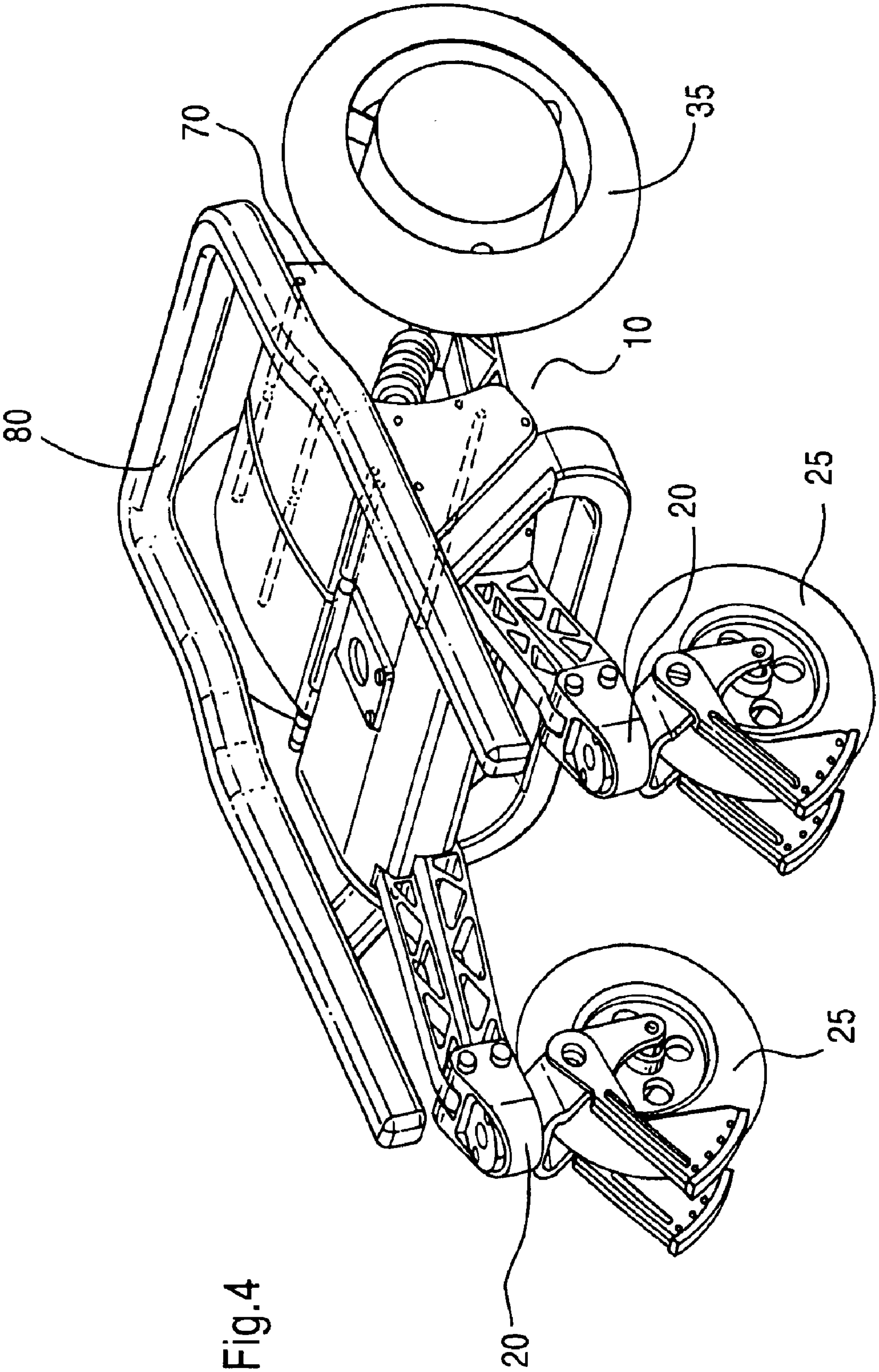
FIG. 4 is a depiction corresponding to FIG. 3 wherein an additional protective cage is attached.

One or several storage batteries 70 can be hooked to the main body 10 via quick release devices 5. The quick release devices 5 for securing the storage batteries 70 comprise interfaces 8 for electric circuits which provide electric connection of the storage batteries 70 to the hub motors. See FIG. 3.

A protection device in the form of a protective cage 80 is, preferably detachably, attached to the main body 10.

Figure 6:
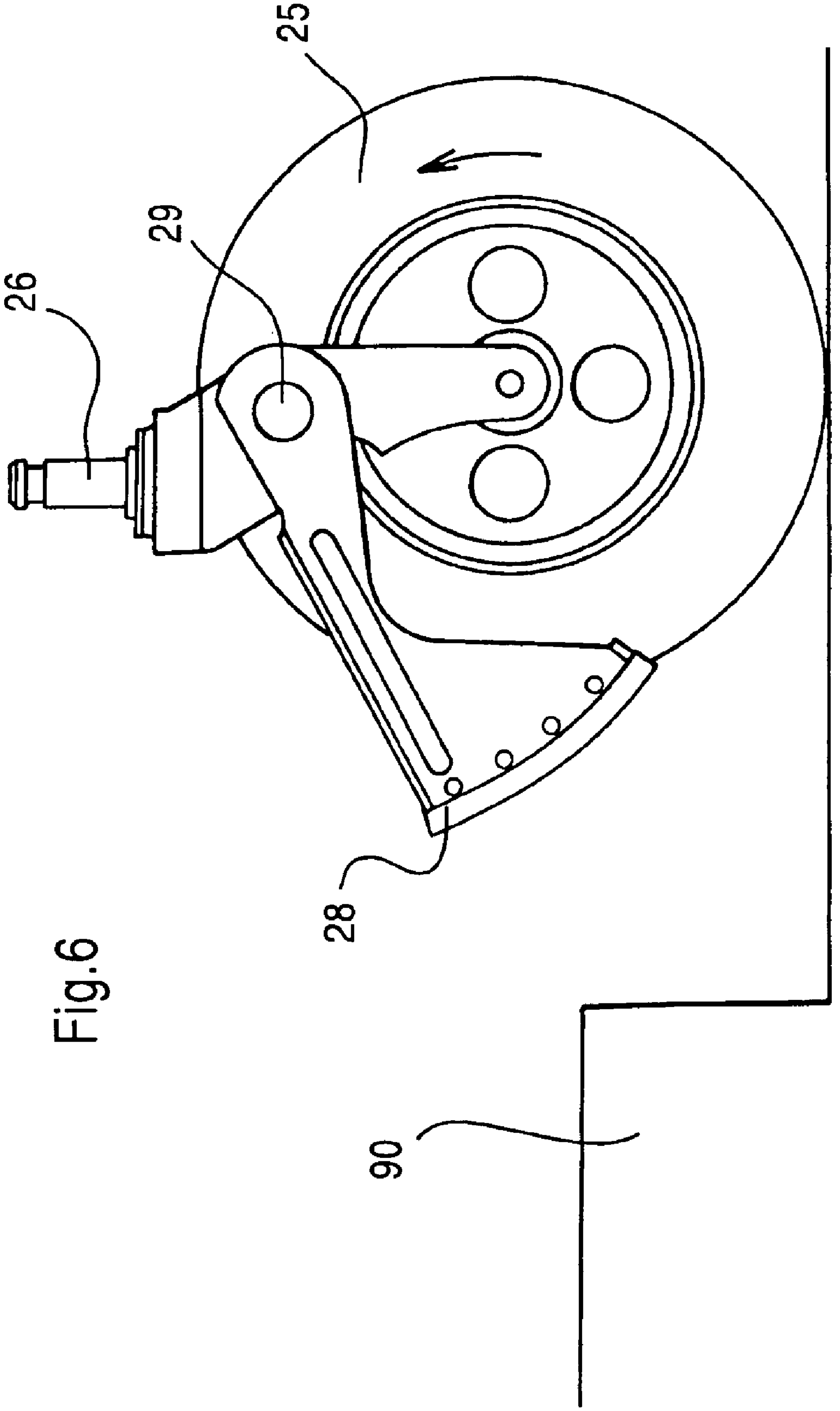
FIG. 6 is a side view of a freely pivotable wheel having a climbing device in a position before a step is contacted.

A climbing device 28 is provided at each of the front wheels 25. There is a pair of climbing devices 28 for each front wheel 25 which is supported on both sides of each front wheel 25 and biased in a way so that under normal operational conditions they are in a position which is depicted in FIG. 6. The climbing device 28 can be pivoted over a certain distance in the direction indicated by arrow A in FIGS. 6 and 7 in the direction of rotation of the wheel with the pivotal axis indicated at reference number 29.

Figure 7:
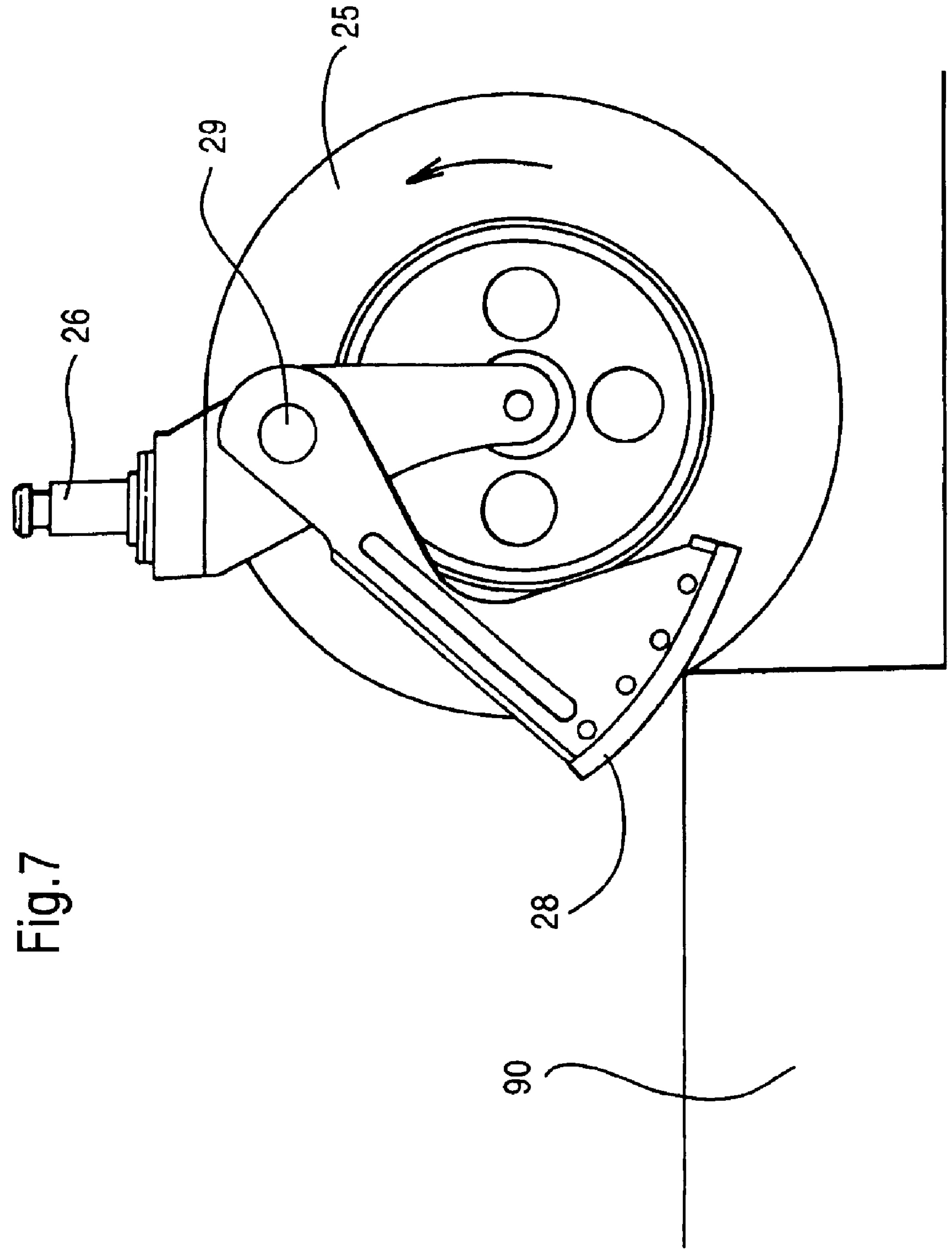
FIG. 7 is a representation corresponding to FIG. 6 in which a step is negotiated.

For the sake of simplicity, only one front wheel 25 is depicted in FIGS. 6 and 7 in order to explain the function of the climbing device 28. When the wheel chair travels in the direction of a curb with the front wheel leading, the climbing device 28 initially is in its upper pivotal position due to the bias force of the spring. When the climbing device 28 gets in contact with curb 90, the climbing device 28 is pivoted in the direction of rotation of the front wheel 25 due to the driving force provided by the driving wheels. As a result, the front wheel 25 is lifted until it gets in contact with the curb in an appropriate position so that upon further travel of the vehicle the curb 90 can be negotiated.

Due to the fact that the climbing devices 28 are directly coupled to the freely rotatable front wheels 25, such climbing devices 28 are always in a suitable orientation with respect to an obstacle, particularly in such cases where a curb or another step is approached at an angle. It is clear that the climbing device also can be directly coupled to the main body.

The seat component 50, the storage batteries 70, the rear wheels 35 and the front wheels 25 can be removed by means of simple quick release devices for dismantling the wheel chair. After being removed, the seat component 50 can be folded. Accordingly, single components are provided which can be transported in a space-saving manner and which can be accommodated in the trunk of a common automobile. The ability to be easily dismantled further provides that the single components have a relatively low weight so that the components can be easily stowed away. The provision of quick release devices facilitates dismantling of the wheel chair also for technically untalented persons and without any tools.

Even though the wheel chair of the present invention is easily dismantled, it is suitable for outdoor use. It combines the comfort of four spring-suspended wheels and the stability required for outdoor operation with the low weight and transportability of a common indoor wheel chair.

Although the invention has been described with reference to exemplary embodiments, it is not limited thereto. Rather, the appended claims should be construed to include other variants and embodiments of the invention which may be made by those skilled in the art without departing from the true spirit and scope of the present invention.

What is claimed:

1. A wheel chair having a modular structure comprising:

a main component;

at least one pivotable wheel, which is detachably mounted at said main component by a quick release device;

at least one driving wheel which is detachably mounted at said main component by a quick release device; and a seat component, which is detachably mounted at said main component by a quick release device;

wherein said main component comprises a main body designed as a monocoque construction to which four arms for supporting said wheels are coupled;

said four arms are springably coupled to said main body; and said quick release devices between said main component and said wheels are disposed between said arms and said wheels, respectively, wherein, when said wheels are detached, said four arms extend in substantially a common plane so that the main component including the main body and said four arms coupled thereto without said wheels has a flat shape; and wherein a smallest cuboid having side lengths a, b and c which can envelop said main component including said main body and said four arms connected thereto without wheels has a side length c which is smaller than half of said side lengths a or b, respectively, wherein said side lengths a and b extend in said common plane of said four arms.

2. The wheel chair as claimed in claim 1, wherein two freely pivotable wheels are detachably mounted at said main component.

3. The wheel chair as claimed in claim 1, wherein two driving wheels are detachably mounted at said main component.

4. The wheel chair according to claim 1, wherein said driving wheel has a hub motor.

5. The wheel chair according to claim 1, wherein said driving wheel is driven by an electric motor.

6. The wheel chair according to claim 5, wherein one or several storage batteries can be mounted at said main component.

7. The wheel chair according to claim 1, wherein said seat component comprises a seat, a seat back, an arm rest, and a foot rest, and the seat component is detachably mounted to said main body as a complete unit by a quick release device.

8. The wheel chair according to claim 7, wherein said seat component is foldable.

9. The wheel chair according to claim 1, wherein front arms for supporting said pivotable wheels are designed as springably supported dual arms defining a caster of said pivotable wheels that remains substantially constant over the range of travel of a spring system defined by said springable support.

10. The wheel chair according to claim 1, wherein said quick release device for detachably mounting said pivotable wheel at said main component comprises a plug-in axle extending perpendicular to the ground.

11. The wheel chair according to claim 1, wherein rear arms for supporting said driving wheels are designed as longitudinal arms which are supported at said main body by a spring/shock absorber unit.

12. The wheel chair according to claim 1, wherein said main component defines interfaces for electric circuits at one or more mounting locations defined by the group consisting of mounting locations for said driving wheels, said seat component, and storage batteries.

13. A wheel chair, having a modular structure comprising:

a main component;

at least one pivotable wheel which is detachably mounted at said main component by a quick release device;

a quick release device for mounting a seat component at said main component;

wherein said main component comprises a main body designed as a monocoque construction to which four arms for supporting said wheels are coupled;

said four arms are springably coupled to said main body; and said quick release devices between said main component and said wheels are disposed between said arms and said wheels, respectively, wherein, when said wheels are detached, said four arms extend in substantially a common plane so that the main component including the main body and said four arms coupled thereto without said wheels has a flat shape; and wherein a smallest cuboid having side lengths a, b and c which can envelop said main component including said main body and said four arms connected thereto without wheels has a side length c which is smaller than half of said side lengths a or b, respectively, wherein said side lengths a and b extend in said common plane of said four arms.

14. The wheel chair as claimed in claim 13, comprising a seat component detachably mounted at said main component by the quick release device.

15. A wheel chair having a modular structure comprising:

a main component;

a quick release device for detachably mounting at least one pivotable wheel at said main component;

a quick release device for detachably mounting a seat component at said main component;

wherein said main component comprises a main body designed as a monocoque construction to which four arms for supporting said wheels are coupled;

said four arms are springably coupled to said main body; and said quick release devices between said main component and said wheels are disposed between said arms and said wheels, respectively, upon detachably mounting said wheels at said main component, wherein, when said wheels are detached, said four arms extend in substantially a common plane so that the main component including the main body and said four arms coupled thereto without said wheels has a flat shape; and wherein a smallest cuboid having side lengths a, b and c which can envelop said main component including said main body and said four arms connected thereto without wheels has a side length c which is smaller than half of said side lengths a or b, respectively, wherein said side lengths a and b extend in said common plane of said four arms.

16. The wheel chair as claimed in claim 15, wherein one or more modular components are detachably mounted at the main component, the modular components defined by the group consisting of the pivotable wheel, the driving wheel, and the seat component.

* * * * *